United States Patent [19]

Seibel et al.

[11] 3,720,539

[45] March 13, 1973

[54] PROCESS FOR IMPROVING THE SURFACE ADHESION OF SHAPED ARTICLES MADE FROM POLYESTERS

[75] Inventors: Markus Seibel, Mainz; Klaus Thoese, Wiesbaden-Schierstein, both of Germany

[73] Assignee: Kalle Aktiengesellschaft, Wiesbaden-Biebrich, Germany

[22] Filed: April 22, 1968

[21] Appl. No.: 723,265

[30] Foreign Application Priority Data

April 25, 1967 Germany .............................. K 62108

[52] U.S. Cl. ............ 117/138.8 F, 117/73, 117/76 F, 117/161 UA, 117/161 UB, 117/161 UE, 117/161 UF
[51] Int. Cl. ......................... B32b 27/08, B44d 5/04
[58] Field of Search...117/138.8 F, 161 UA, 161 UE, 117/161 UC, 161 UH, 73, 76 F

[56] References Cited

UNITED STATES PATENTS

| | | | |
|---|---|---|---|
| 2,893,896 | 7/1959 | Beeber et al. | 117/138.8 F |
| 3,058,939 | 10/1962 | Meier | 117/138.8 F |
| 3,271,190 | 9/1966 | Nadeau | 117/138.8 F |
| 3,337,364 | 8/1967 | Whitbourne | 117/76 F |
| 3,374,197 | 3/1968 | England et al. | 117/138.8 F |
| 3,396,046 | 8/1968 | Landau | 117/76 F |

*Primary Examiner*—William D. Martin
*Assistant Examiner*—Sadie L. Childs
*Attorney*—James E. Bryan

[57] ABSTRACT

This invention relates to a process for modifying the surface of a shaped article made from a polyester which comprises treating the article with an aqueous solution containing a halogenated fatty acid, a wetting agent and a polymer which is compatible with the halogenated fatty acid, and drying the treated article.

1 Claim, No Drawings

PROCESS FOR IMPROVING THE SURFACE ADHESION OF SHAPED ARTICLES MADE FROM POLYESTERS

This invention relates to a process for modifying the surfaces of shaped articles made from polyesters by treatment thereof with aqueous solutions containing halogenated fatty acids and wetting agents.

Shaped articles, e.g., fibers or films, made from polyesters have excellent physical and chemical properties, e.g., high dimensional stability and resistance to chemicals and solvents. The latter desirable property, however, entails considerable disadvantages for certain applications. It is thus extremely difficult to apply functional layers of different chemical nature, e.g., heat-sealable layers or light-sensitive reproduction layers, since they have an exceptionally poor adhesion to polyester surfaces.

Various processes have been suggested to improve the adhesion of coating to the surface of shaped articles made from polyesters. Generally, they include a treatment of the surface with solutions of certain substances which alter the surface physically or chemically. Simple and uniform wetting of the surface with the treating solution which is required therefor could be best achieved by the use of organic solvents. It thus has been suggested to treat the surface with a solution of a halogenated fatty acid and a resin in an organic solvent.

For the reasons of technologically substantially simpler handling and the better obtainable adhesion of hydrophilic coatings, pretreatment with aqueous solutions would be preferable, however. It thus has also been suggested to expose the surface to the action of concentrated sulfuric acid, if desired with the addition of oxidants, and to subsequently wash the treated surface with water. The process inter alia has the disadvantage that, after treatment, the sulfuric acid must be carefully removed, an additional cumbersome washing process being required therefor. Furthermore, it has been suggested to use aqueous solutions of halogenated fatty acids, e.g., trichloroacetic acid. The trichloroacetic acid remaining after drying can be removed relatively simply by thermal decomposition. The process, however, has the disadvantage that the aqueous solution does not uniformly wet the polyester surface so that no uniform modification of the surface can be achieved. In order to overcome this drawback, wetting agents have been added to the treating solution. The success achieved thereby has not been sufficient, however, obviously because the wetting agents become inactive as soon as a concentrated halogenated fatty acid solution results during the evaporation of the water. According to another proposal, finely divided silica was additionally added to the solution of halogenated fatty acid and wetting agent. This addition resulted in a markedly more uniform modification of the surface. For certain purposes, e.g., for applying completely homogeneous, particularly hydrophilic, copying layers, further improvement of the uniformity and thus of the adhesion would be desirable. Furthermore, this process has the disadvantage that the addition of finely distributed silica, impairs the transparency of the finished product so that no completely clear, highly transparent materials can be prepared therewith.

The process of the present invention modifies the surfaces of shaped articles made from polyesters in a manner such that the application of a completely homogeneous, uniformly firmly adhering coating is possible with the formation of products of high transparency.

In the present process for the modification of the surface of a shaped article made from a polyester, the shaped article is coated with an aqueous solution containing a halogenated fatty acid and a wetting agent and heated. Further, a dissolved or dispersed polymer is added to the solution, which polymer is compatible with the halogenated fatty acid.

Polymers for use in the invention which are compatible with the halogenated fatty acid in aqueous solution are those which do not precipitate with the acid. Such precipitates may occur by the reaction of the acid with the polymer, or with the stabilizer of the dispersion, or by physical action, e.g., by salting out. The suitability of the polymer for the purpose of the invention easily may be determined by a simple test. Preferable soluble polymers are polyacrylamide and polyvinyl alcohol, preferable dispersed polymers are polyvinyl acetate and polyvinylidene chloride, which also may contain small quantities of other monomeric units. Generally, it is advantageous to use a soluble polymer for pretreatment when hydrophilic coatings are to be applied and, on the other hand, dispersions of water-insoluble polymers for anchoring hydrophobic coatings.

Particularly suitable halogenated fatty acids are the chlorinated acetic acids, e.g., trichloroacetic acid. Also, halogenated fatty acids having longer chains, e.g., 2,2,3-trichloropropionic acid, or fatty acids containing other halogen atoms, e.g., trifluoroacetic acid, may be used. The concentration of halogenated fatty acid in the pretreatment solution may vary within wide limits; generally it is between 5 and 20 percent by weight, preferably between 5 and 10 percent by weight. The proportion by weight of polymer to halogenated fatty acid generally is between 1:1 and 1:20.

Suitable polyesters having surfaces which can be modified in accordance with the invention are all high-molecular weight condensation products of multivalent carboxylic acids with multivalent alcohols, which yield deformable crystalline or partially crystalline products. Preferably used are polyesters from terephthalic acid and ethylene glycol, but especially copolymers of these monomers with other dicarboxylic acids, e.g., isophthalic acid, and other bi- or multivalent alcohols, e.g., 1,3-propanediol, 1,4-butanediol, neopentylglycol, and the like may be used.

To the pretreated shaped articles made from polyesters, there are applied in known manner layers which are distinguished by an excellently uniform adhesion. Depending on the nature of the top coatings, the finished products may be used as sealable packaging films, for example, or—after sensitizing in known manner—as transparent light-sensitive reproduction materials.

Pretreatment in accordance with the invention of shaped articles made from polyesters is illustrated by way of films in the following examples. The process, however, may be applied in the same manner to other shaped articles, e.g., fibers, and the like. All quantities stated in the examples relate to the substance contained in the solution.

EXAMPLE 1

A 50µ thick film of biaxially stretched heat-set polyethylene terephthalate is immersed into a solution of the following composition:

| | |
|---|---|
| 100 g. | of trichloroacetic acid, |
| 10 g. | of polyvinyl alcohol having a K value of 70 and free of acetyl groups (Mowiol N 70/98), |
| 1.5 g. | of commercial cleansing agent, + and |
| 890 g. | of water. |

+ The active constituents of the cleansing agent are a mixture of anionic wetting agents (fatty alcohol sulfates and alkylaryl sulfonates) and non-ionic wetting agents (alkylbenzene polyglycol ether).

The film is dried for 2 minutes at 140°C. in a drying cabinet. A completely uniform very thin layer of polyvinyl alcohol remains. The treated surface easily may be wetted with water, even after storage for several days under running water.

The film is also easily wettable when it is heated for 30 minutes to 140°C., for example.

To the film pretreated as described above there is applied an approximately 10µ thick film of an aqueous solution of the following composition:

| | |
|---|---|
| 700 g. | of aluminum silicate (ASP 100), |
| 200 g. | of polyvinyl alcohol, K value 70 and containing acetyl groups (Mowiol N 70/88), |
| 100 g. | of polyvinyl acetate, added in the form of a 50 percent aqueous dispersion having a particle size between 0.5 and 5µ and including polyvinyl alcohol as a protective colloid (Mowilith DN) |
| 10 g. | of melamine-formaldehyde resin (Cassurit MLP), and |
| 4000 g. | of water. |

The aqueous solution is adjusted to a pH value of 1 to 2 by means of diluted sulfuric acid.

The film is dried for 5 minutes at 140°C. in a drying cabinet and then may be sensitized in known manner with aqueous solutions containing light-sensitive substances.

The adhesion of the pigment-containing hydrophilic layer to the pretreated film is excellent. The following tests were carried out for testing the adhesion:

A. Rub Test

The film is held with both hands and rubbed to and fro for at least 10 seconds. In the case of good adhesion, the layer does not separate at any place from the support.

B. Adhesive Tape Test

The layer was scratched by means of a testing apparatus producing grid-like incisions according to DIN (German Industrial Standards) 53131, type GS 30. A pressure-sensitive adhesive tape (Tesa tape No. 104) was applied to the layer and firmly pressed thereto by rubbing the handle of scissors to and fro thereon. The tape was then rapidly jerked back by means of its overlapping end. In the case of excellent adhesion, the layer is not damaged.

EXAMPLE 2

For treating the surfaces of polyethylene terephthalate films, solutions of the compositions stated in the following were tested according to the processes stated in Example 1.

| Concentration of trichloro-acetic acid in water (%) | Proportion by weight Polyvinyl alcohol (Mowiol N 70/98): trichloroacetic acid | Adhesion of the pigment layer |
|---|---|---|
| 10.0 | | excellent |
| 6.7 | 1 : 5 | good to moderate |
| 3.3 | | good to moderate |
| 10.0 | | excellent |
| 6.7 | | excellent |
| 5.0 | 1 : 10 | excellent |
| 3.3 | | good to moderate |
| 10.0 | | excellent |
| 6.7 | | excellent |
| 5.0 | 1 : 15 | excellent |
| 3.3 | | good to moderate |

All solutions contained 0.15 percent of the cleansing agent of Example 1 as the wetting agent. Concentrations of trichloroacetic acid higher than 10 percent did not result in an improvement but rendered the polyvinyl alcohol layers tacky.

EXAMPLE 3

To a film pretreated as in Example 1, there was applied a film from a solution of the following composition:

| | |
|---|---|
| 100 g. | of polyvinyl alcohol having a K value of 70 and containing acetyl groups (Mowiol N 70/88), |
| 5 g. | of dimethylol urea, |
| 2 g. | of sulfuric acid, and |
| 900 g. | of water. |

The film was dried for 3 minutes at 120°C. Its adhesion to the support was excellent according to both testing methods of Example 1.

A polyvinyl alcohol film prepared in the same manner but applied to a film which had been pretreated only with an aqueous solution of trichloroacetic acid and a wetting agent had no adhesion.

EXAMPLE 4

The procedure was the same as in Example 3 and the following solution was applied for coating:

| | |
|---|---|
| 100 g. | of hydroxyethyl cellulose, |
| 5 g. | of dimethylol urea, |
| 2 g. | of hydrochloric acid, |
| 1 g. | of cleansing agent as in Example 1, and |
| 1900 g. | of water. |

The film was dried for 3 minutes at 120°C. Its adhesion to the support was excellent.

A film prepared from the same solution but applied to a polyethylene terephthalate film which had been pretreated only with an aqueous solution of trichloroacetic acid and a wetting agent had no adhesion to the support.

EXAMPLE 5

A 190µ thick biaxially stretched heat-set polyethylene terephthalate film was coated with the following solution:

| | |
|---|---|
| 100 g. | of trichloroacetic acid, |
| 10 g. | of polyacrylamide (Cyanamer P 250), and |
| 900 g. | of water. |

The film was dried for about 3 minutes at 120°C. A uniform thin polyacrylamide film was obtained onto which a 2 percent solution of the same polyacrylamide was cast. After drying at 120°C., the polyacrylamide excellently adhered to the polyester film. A film of the same polyacrylamide did not adhere to a film pretreated with an aqueous solution containing only trichloroacetic acid and a wetting agent.

EXAMPLE 6

Two samples of a 38$\mu$ thick biaxially stretched heat-set polyethylene terephthalate film were each coated with one of the following solutions and dried for 3 minutes at 120°C.

| | | |
|---|---|---|
| I. | 100 g. | of trichloroacetic acid, |
| | 3 g. | of cleansing agent as in Example 1, and |
| | 900 g. | of water. |
| II. | 100 g. | of trichloroacetic acid, |
| | 10 g. | of polyvinyl acetate, added as 56 percent aqueous dispersion having a particle size of 0.3 to 2$\mu$ and including water-soluble cellulose derivatives as protective colloids (Mowilith DC), |
| | 3 g. | of cleansing agent as in Example 1, and |
| | 890 g. | of water. |

To the pretreated films there were applied 10 percent polyvinyl acetate dispersions obtained by correspondingly diluting from the dispersions described below. The films were dried for 3 minutes at 120°C. and the adhesion was tested according to the methods of Example 1.

| | Adhesion of the polyvinyl acetate samples | |
|---|---|---|
| Precoat | a | b |
| trichloracetic acid and Mowilith DC (I) | good | good |
| trichloracetic acid (II) | poor | poor | a = 50 percent aqueous dispersion having a particle size of 0.5 to 5$\mu$ including polyvinyl alcohol as a protective colloid (Mowilith DN)
b = 50 percent aqueous dispersion having a particle size of 0.5 to 3$\mu$ and including polyvinyl alcohol as a protective colloid (Mowilith DHN).

EXAMPLE 7

To a 38$\mu$ thick biaxially stretched and heat-set polyethylene terephthalate film there was applied the following solution, which was dried for 2 minutes at 120°C.

| | |
|---|---|
| 100 g. | of trichloracetic acid, |
| 30 g. | of polyvinylidene chloride, added as 55 percent dispersion (Diofan 230 D), |
| 3 g. | of cleansing agent as in Example 1, |
| | and |
| 900 g. | of water. |

After drying, a uniform film remained which was coated with the following lacquer solution:

| | |
|---|---|
| 80 g. | of cellulose acetate propionate with a content of 57 percent of propionic acid and 3 percent of acetic acid, |
| 500 g. | of acetone, and |
| 500 g. | of methyl ethyl ketone. |

The lacquer was dried for 3 minutes at 110°C. The remaining film had a thickness of about 8$\mu$ and adhered excellently to the support. A film of cellulose acetate propionate which was cast onto a film pretreated only with trichloroacetic acid had no adhesion or only moderate adhesion when its adhesion was tested according to the methods of Example 1.

EXAMPLE 8

The following solutions were applied to a 75$\mu$ thick biaxially stretched and heat-set film of polyethylene terephthalate. Drying was then carried out for 2 minutes at 120°C.

| | |
|---|---|
| 60 g. | of trichloroacetic acid, |
| 12 g. | of polyvinyl acetate, added as 55 percent dispersion having a particle size of 0.3 to 2$\mu$ and including polyvinyl alcohol as a protective colloid (Mowilith DM 1), |
| 30 g. | of polyvinylidene chloride, added as 55 percent dispersion in water (Diofan 230 D), |
| 3 g. | of anionic wetting agent (straight-chain alkylaryl sulfonate), and |
| 900 g. | of water. |

After drying, a uniform film remained to which the following lacquer solution was applied.

| | |
|---|---|
| 80 g. | of cellulose acetate propionate having a content of 57 percent of propionic acid and 3 percent of acetic acid, |
| 500 g. | of acetone, and |
| 500 g. | of methyl ethyl ketone. |

The approximately 8$\mu$ thick lacquer layer adheres excellently to the support. When applying a corresponding layer to a similar film pretreated, however, only with trichloroacetic acid, the cellulose acetate propionate does not adhere or has only a moderate adhesion, tested according to the methods of Example 1.

It will be obvious to those skilled in the art that many modifications may be made within the scope of the present invention without departing from the spirit thereof, and the invention includes all such modifications.

What is claimed is:

1. A process for modifying the surface of a shaped article made from a polyester which comprises treating the article with an aqueous solution containing a halogenated fatty acid, a wetting agent, and a polymer selected from the group consisting of polyacrylamide and polyvinyl alcohol, and drying the treated article.

* * * * *